United States Patent
Choiniere et al.

(10) Patent No.: US 12,046,032 B2
(45) Date of Patent: Jul. 23, 2024

(54) PUSH BROOM CLUTTER REJECTION USING A MULTIMODAL FILTER

(71) Applicant: BAE Systems Information and Electronic Systems Integration Inc., Nashua, NH (US)

(72) Inventors: Michael J. Choiniere, Merrimack, NH (US); Jay W. Coffey, Chelmsford, MA (US); Jason R. Lane, Brookline, NH (US); Davis A Lange, Sturbridge, MA (US); Paul D. Zemany, Amherst, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 659 days.

(21) Appl. No.: 17/178,165

(22) Filed: Feb. 17, 2021

(65) Prior Publication Data

US 2022/0260340 A1 Aug. 18, 2022

(51) Int. Cl.
*G06V 20/17* (2022.01)
*F41G 7/22* (2006.01)
(Continued)

(52) U.S. Cl.
CPC .......... *G06V 20/17* (2022.01); *F41G 7/2253* (2013.01); *F41G 7/2293* (2013.01);
(Continued)

(58) Field of Classification Search
None
See application file for complete search history.

(56) References Cited

U.S. PATENT DOCUMENTS

| 5,129,595 A | 7/1992 | Thiede et al. |
| 7,145,124 B2 | 12/2006 | Garrood et al. |

(Continued)

FOREIGN PATENT DOCUMENTS

| WO | WO2009156362 | * 12/2009 | ............ H04N 5/33 |

OTHER PUBLICATIONS

Hooper et al ("An Airborne Imaging Multispectral Polarimeter (AROSS-MSP)", IEEE Xplore, Nov. 2009, pp. 1-10) (Year: 2009).*

(Continued)

*Primary Examiner* — Leon Viet Q Nguyen
(74) *Attorney, Agent, or Firm* — Gary McFaline; Scott Asmus

(57) ABSTRACT

A ground imaging system for use on a guided aerobody includes one or more lenses designed to receive EM radiation from a ground level, a filter substrate having a plurality of filters, a sensor array designed to receive the EM radiation from the filter substrate, and a processing device coupled to the sensor array. The filter substrate is located at a focal plane of the one or more lenses such that the filter substrate receives the EM radiation from the one or more lenses. The plurality of filters includes at least polarization filters and multispectral filters. The processing device is designed to analyze multispectral and polarization signatures of the electromagnetic radiation from identified objects at the ground level and determine that one or more of the objects is not a desired target based at least on the hyperspectral and polarization signatures of the one or more objects.

11 Claims, 7 Drawing Sheets

(51) Int. Cl.
*G01J 3/28* (2006.01)
*G06F 18/2113* (2023.01)
*G06V 10/75* (2022.01)

(52) U.S. Cl.
CPC ........ *G01J 3/2823* (2013.01); *G06F 18/2113* (2023.01); *G06V 10/751* (2022.01)

(56) References Cited

U.S. PATENT DOCUMENTS

| | | |
|---|---|---|
| 9,885,784 B2 | 2/2018 | Ranney et al. |
| 10,473,429 B1 | 11/2019 | Louchard |
| 2009/0156362 A1 | 12/2009 | Berg |
| 2014/0268146 A1* | 9/2014 | Hinnrichs ............. G01J 3/0229 356/416 |
| 2016/0273963 A1* | 9/2016 | Herrick ................. G01J 3/0224 |
| 2020/0284883 A1 | 9/2020 | Ferreira et al. |
| 2021/0088799 A1 | 3/2021 | Choinere et al. |
| 2022/0196471 A1* | 6/2022 | Gerwe ................... H04N 23/11 |
| 2022/0336511 A1* | 10/2022 | Barbour .............. H01L 31/0232 |

OTHER PUBLICATIONS

Hooper, B.A. et al. "An Airborne Imaging Multispectral Polarimeter (AROSS-MSP)." IEEE Xplore. Nov. 2009, pp. 1-10, p. 3, col. 1-2 [online] < https://www.researchgate.net/publication/224119525_An_airborne_imaging_multispectral_polarimeter_AROSS-MSP >.
International Search Report, PCT/US22/16508, mailed May 13, 2022, 8 pages.

\* cited by examiner

PUSH BROOM CLUTTER REJECTION USING A MULTIMODAL FILTER

BACKGROUND

Guidance systems for projectiles, such as precision guided munitions, are used in various applications, including targeting applications that involve a specific target that is proximate one or more non-targets. By efficiently and effectively determining correct targets from non-targets, the risk of collateral or otherwise unintended damage is minimalized or otherwise reduced. Since the guided projectile is moving quickly, the guidance system must also make decisions quickly regarding whether an identified object within the system's field of view is friend, foe, or natural (e.g., a rock or vegetation). Accordingly, improvements to how quickly such guidance systems can identify what an object is can greatly increase successfully guiding to an intended target. There are many complex challenges regarding how to efficiently analyze received imaging data from a surrounding area to quickly identify a desired target from amongst other possible targets.

BRIEF DESCRIPTION OF THE DRAWINGS

Features and advantages of embodiments of the claimed subject matter will become apparent as the following Detailed Description proceeds, and upon reference to the Drawings, in which:

Figure 1A:
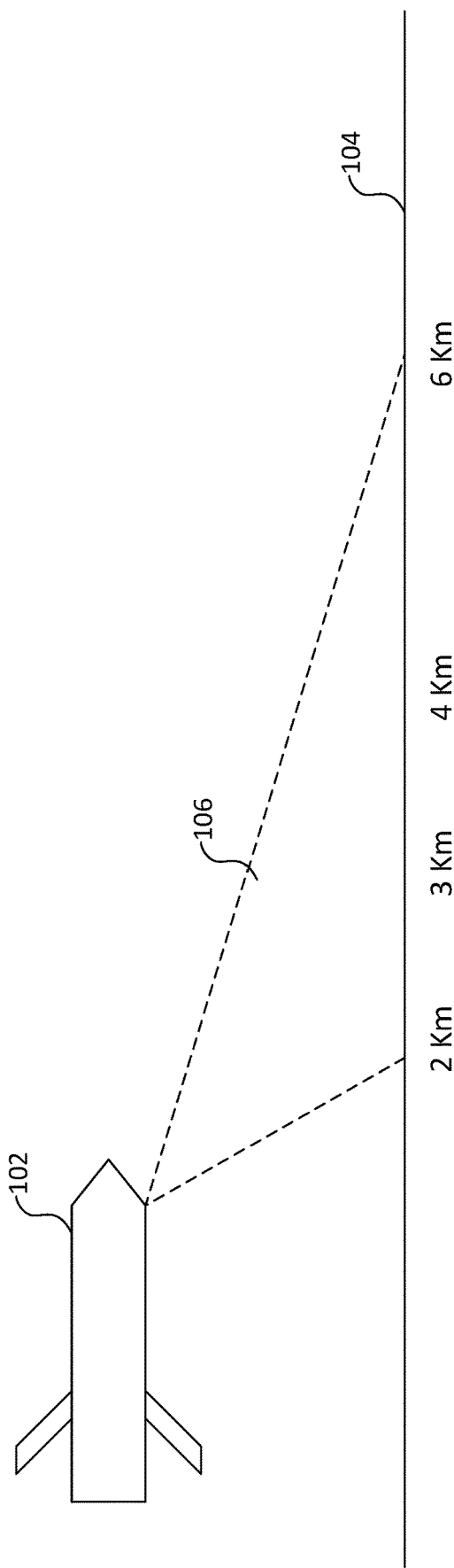
FIG. 1A illustrates a guided projectile imaging a portion of the ground that is mapped across a filter substrate, in accordance with some embodiments of the present disclosure.

Although the following Detailed Description will proceed with reference being made to illustrative embodiments, many alternatives, modifications, and variations thereof will be apparent in light of this disclosure.

DETAILED DESCRIPTION

Techniques are disclosed for guiding projectiles to a designated target or targets. In an embodiment, the guided projectile includes a ground imaging system that captures electromagnetic (EM) radiation from an area of the ground in front of the projectile as it flies through the air. A sensor array, such as a focal plane array or a microbolometer of the imaging system, is designed to capture at least infrared radiation from the ground. Objects can be identified based on various signatures from the received infrared radiation. However, as previously noted, determining that a given object is the intended target of the guided projectile is challenging, especially when the identified object is at the far end of the projectile's field of view (FOV). For example, an object may be identified that is 6 Km away and has a sensor pixel size of 2×2 pixels. It is difficult to determine whether the object is an enemy tank, a large rock, a small building, a dense area of vegetation, etc. This is especially true for systems that only use one imaging modality when analyzing the incoming EM radiation (e.g., systems that only use contrast difference to determine object location and type). Due to the push-broom effect, as the guided projectile continues to fly forward, the object that was at 6 Km away becomes closer (e.g., at 4 Km away) and becomes larger in the FOV, thus encompassing more pixels of the sensor array (e.g., 3×3 pixels). A more accurate determination of the object type can be made based on receiving more image data about the object (now 3×3 imaging pixels), however, some situations may result in failure if it takes too long to determine that the object is the intended target of the guided projectile. For example, in some situations, by the time the projectile is able to determine that the target it was tracking is not an enemy vehicle, it may be too late to change the course of the projectile.

Thus, and in accordance with some such embodiments, the ground imaging system further includes a filter substrate having a plurality of different types of filters in order to analyze a plurality of imaging modalities of the ground around the projectile. Rather than projecting the received EM radiation directly onto a sensor array, the received EM radiation is instead focused onto the filter substrate and then imaged onto a sensor array after passing through the filter substrate. The filter substrate includes a plurality of different filter types such as polarization filters and multispectral filters to provide different imaging modalities to be analyzed by a processing device. In particular, the filter substrate includes various columns or bands of different filter types such that EM radiation from a given object within the system's FOV will pass through multiple filter bands as the projectile flies closer to that object due to the push broom effect where sensors are arranged in columns perpendicular to the direction of travel in order to collect data along different columns of sensors as the projectile moves towards the object. According to some embodiments, the processing device is configured to analyze contrast, polarization, and multispectral signatures of the EM radiation received via the filter substrate. These additional signatures yield more robust information regarding the type of object being identified and allow for the processing device to quickly reject certain identified objects (also known as clutter) as not being the intended target based on their contrast, polarization, and/or multispectral signatures. According to some embodiments, a field programmable gate array (FPGA) is used as the processing device due to its compact size and comparatively fast processing speed for its size.

According to some embodiments, contrast information from the received EM radiation is analyzed first to determine the presence of objects, followed by analysis of polarization and/or multispectral signatures of the identified objects to determine the type of object. For example, a man-made vehicle, such as a tank, typically has numerous flat surfaces that produce a particular polarization signature, but a naturally occurring object, such as a rock, typically has numerous rough surfaces that would produce a very different polarization signature. Multispectral signatures can also be used to determine wavelength-specific intensities from certain objects that can be used to identify what those objects are.

The techniques may be embodied in devices, systems, methods, or machine-readable mediums, as will be appreciated. For example, according to one example embodiment of the present disclosure, a ground imaging system for use on a guided aerobody includes one or more lenses designed to receive EM radiation from objects and terrain at a ground level, a filter substrate having a plurality of filters, a sensor array designed to receive the EM radiation from the filter substrate, and a processing device coupled to the sensor array. The filter substrate is located at a focal plane of the one or more lenses such that the filter substrate receives the EM radiation from the one or more lenses. The plurality of filters includes at least polarization filters and multispectral filters. The processing device is designed to analyze multispectral and polarization signatures of the electromagnetic radiation from the objects and terrain at the ground level, and determine that one or more of the objects is not a desired target based at least on the hyperspectral and polarization signatures of the one or more objects.

According to another example embodiment, a filter substrate for use in an imaging system includes a substrate that includes a plurality of polarization filters arranged in first columns, a plurality of multispectral filters arranged in second columns, and a plurality of unfiltered regions arranged in third columns. The filter substrate is designed to receive electromagnetic radiation and map the electromagnetic radiation onto a sensor array. The first columns, second columns, and third columns are adjacently arranged one after the other.

Numerous examples are described herein, and many others will be appreciated in light of this disclosure.

General Overview

FIG. 1A illustrates a guided aerobody 102 in flight over a ground surface 104. Guided aerobody 102 may be any long- or short-range projectile such as a missile or rocket with guidance capability to affect its trajectory mid-flight. In one embodiment, the guidance system onboard aerobody 102 includes a guidance component that controls a flightpath of aerobody 102 and an imaging component that receives EM radiation received from an area around aerobody 102 or from a portion of ground surface 104 beneath aerobody 102. The imaging component of aerobody 102 has a field of view (FOV) 106 across a portion of ground surface 104. In the illustrated example, FOV 106 extends between about 2 Km and about 6 Km from the front of aerobody 102. These numbers are provided as just one example, and the exact extent of FOV 106 is dependent both on the optics of the imaging system itself and the altitude of aerobody 102 above ground surface 104.

EM radiation is received from objects within FOV 106. These objects may include any type of large structure, vehicle, or naturally occurring thing, such as tanks, boats, trucks, man-made structures, rocks, terrain formations, vegetation, etc. One of the detected objects may be an intended target of aerobody 102. Thus, the imaging system and guidance system work together to identify the intended target from amongst the various detected objects and steer aerobody 102 towards the intended target. According to some embodiments discussed herein, various signatures from the EM radiation received from the objects (such as polarization, contrast, and multispectral signatures) are used to quickly filter out objects that are not the intended target.

Figure 1B:
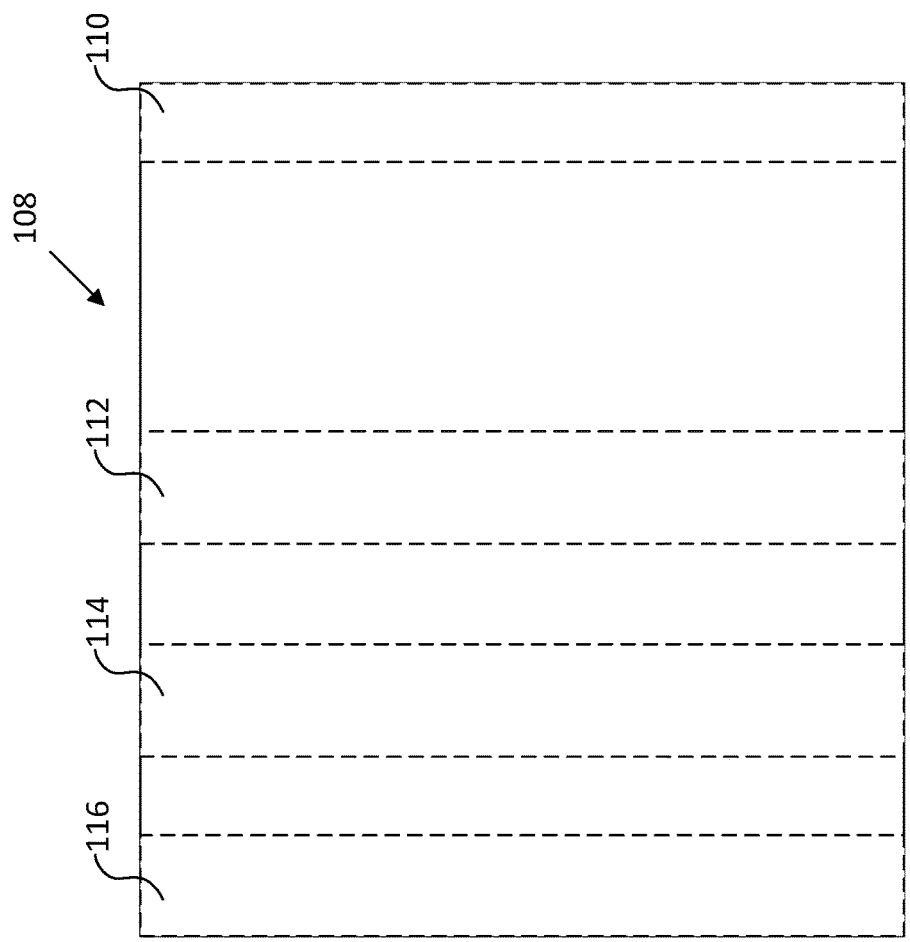
FIG. 1B illustrates a top-down view of the filter substrate used on the guided projectile from FIG. 1A, in accordance with some embodiments of the present disclosure.

FIG. 1B illustrates a filter substrate 108 that is part of imaging component onboard aerobody 102, according to some embodiments. The EM radiation received across FOV 106 along ground surface 104 is projected onto filter substrate 108. Filter substrate 108 includes a plurality of different filter types across its surface in order to analyze different spectral or polarization signatures of the received EM radiation. For example, filter substrate 108 includes a plurality of polarization filters for filtering different polarization angles and a plurality of multispectral filters to provide different wavelength signatures. In some embodiments, filter substrate 108 also includes regions where no filters are provided (e.g., the EM radiation passes through filter substrate 108 with little to no modulation). The unmodulated EM radiation may be used for contrast analysis to determine locations of objects within FOV 106.

Objects that are imaged at the far end of FOV 106 (e.g., at 6 Km away) will continue to be imaged as aerobody 102 moves closer to them. Objects also will get larger as aerobody 102 moves closer to them. In other words, an object first imaged at 6 Km will also be imaged at a closer location, such as at 4 Km, (and look larger), and again will be imaged at an even closer location, such as 3 Km, (and look even larger). As objects become larger within FOV 106, more EM radiation can be collected from the objects and more information can be analyzed about them. By mapping the EM radiation collected from FOV 106 across filter substrate 108, EM radiation collected from a given object on ground surface 104 is effectively scanned across filter substrate 108 in the direction of arrow 111 due to the push broom effect. For example, an object imaged at 6 Km away will have its EM radiation received at first region 110 of filter substrate 108. When the object is 4 Km away, it will have its EM radiation received at second region 112 of filter substrate 108. When the object is 3 Km away, it will have its EM radiation received at third region 114 of filter substrate 108. And when the object is 2 Km away, it will have its EM radiation received at fourth region 116 of filter substrate 108. Accordingly, filter structures on a surface of filter substrate 108 are arranged in columns (or rows depending on one's perspective) within various sections of filter substrate 108 that correspond to distance away from aerobody 102, according to some embodiments. In one example, each of first region 110, second region 112, third region 114, and fourth region 116 includes columns of polarization filters, multispectral filters, and contrast regions (e.g., no filtering). According to some embodiments, first region 110 includes a fewest number of columns compared to the other regions because objects will be smallest at the furthest distance away in FOV 106, and fourth region 116 includes the most columns compared to the other regions because objects will be largest at the closest distance within FOV 106. According to some embodiments, any given column on filter substrate 108 includes one type of filter (e.g., polarization, multispectral, or contrast). Further details regarding the arrangement of the different filters on filter substrate 108 are described with reference to FIGS. 3 and 4.

Figure 2:
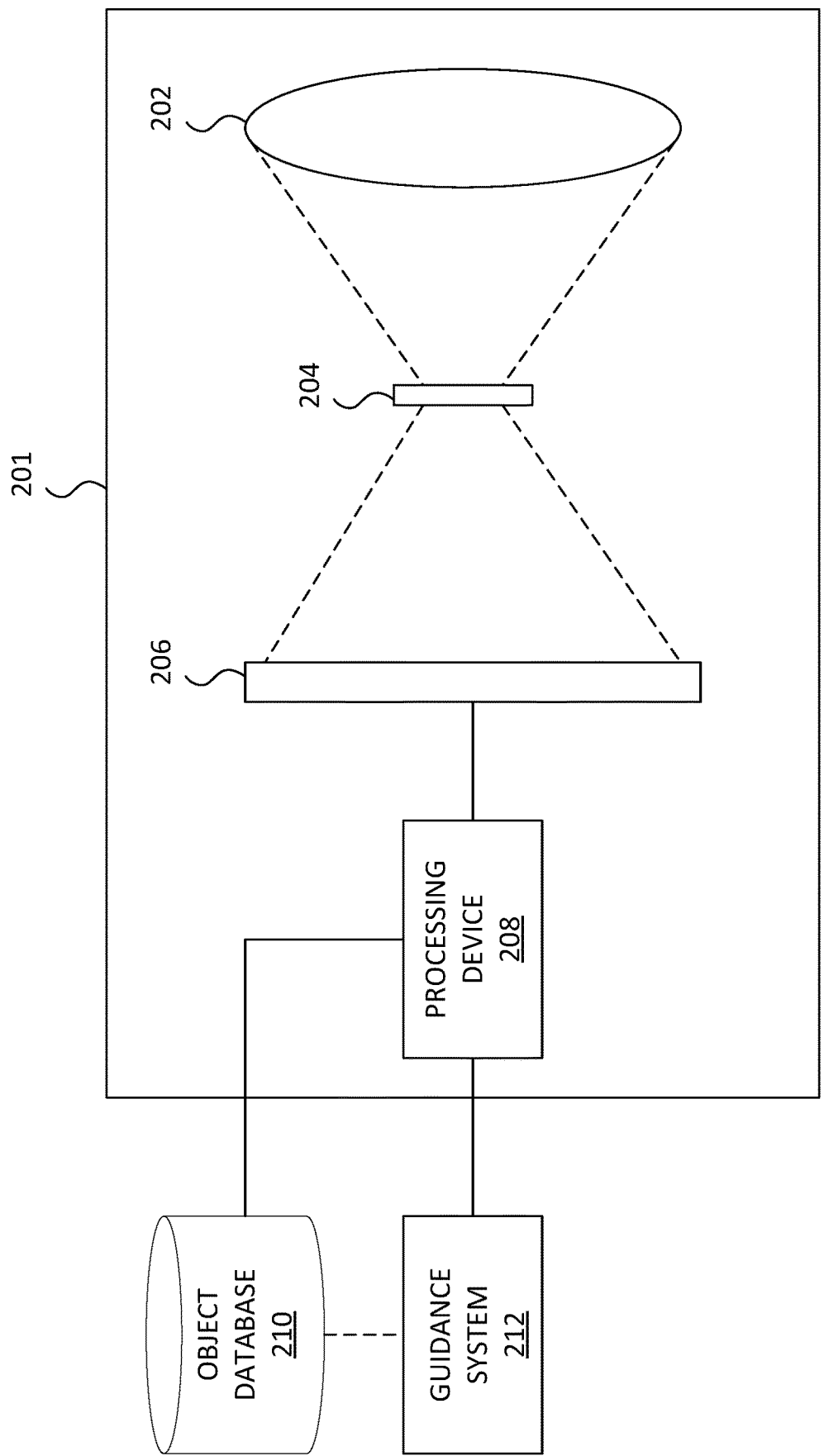
FIG. 2 illustrates an example ground imaging system coupled to a guidance system for use onboard a guided areobody, according to some embodiments of the present disclosure.

FIG. 2 illustrates an example ground imaging system 201 coupled to a guidance system 212 for use onboard a guided aerobody, according to some embodiments. Ground imaging system 201 includes a lens 202, a filter substrate 204, a sensor array 206, and a processing device 208. EM radiation is received from across the FOV in front of the aerobody and collected at lens 202 where it is focused onto filter substrate 204. According to some embodiments, filter substrate 204 is placed at the focal plane of lens 202. Filter substrate 204 may have an arrangement of filters across its surface in accordance with any of the examples discussed herein.

Lens 202 may represent any number of lenses or other passive optical components designed to focus the received EM radiation onto filter substrate 204. After the light passes through filter substrate 204, it is imaged across a two-dimensional sensor array 206. The various columns of sensors of sensor array 206 correspond to columns of filters on filter substrate 204, according to some embodiments. Accordingly, some columns of sensors of sensor array 206 receive polarized light while other columns of sensors of sensor array 206 receive multispectral bands of the received EM radiation. Still other columns of sensors of sensor array 206 receive unfiltered light, according to an embodiment. Sensor array 206 may be a microbolometer or a focal plane array. According to some embodiments, the sensors of sensor array 206 are designed to be particularly sensitive to light within the long wave infrared (LWIR) portion of the EM spectrum.

Each sensor of sensor array 206 may be referred to as a single pixel. A given object has a certain pixel size depending on its distance away, which grows larger as the object gets closer. For example, an object said to have a pixel size of 2×2 at a distance of 6 Km away means that the EM radiation from the object is received across a 2×2 portion of sensors in sensor array 206. As the object gets closer, a larger number of sensors (e.g., 4×4 pixels) will receive EM radiation from the object. Additionally, because columns of sensors of sensor array 206 correspond with columns of filters on filter substrate 204, EM radiation received from a given object is scanned across the sensors of sensor array 206 in the same way that it is received across filter substrate 204 due to the push broom effect. Accordingly, certain columns of sensors may be designated to receive different signatures of the received EM radiation based on the filters (or no filters) the EM radiation passed through as it traversed through filter substrate 204.

The output of sensor array 206 is received by a processing device 208. Generally, As used herein, the term "processing device" may refer to any device or portion of a device that processes electronic data from registers and/or memory to transform that electronic data into other electronic data that may be stored in registers and/or memory. According to some embodiments, processing device 208 comprises a field-programmable gate array (FPGA) architecture due to its speed in analyzing multiple sensor inputs at once and due to its relatively small circuit board footprint for its processing power. Processing device 208 may use image processing techniques to analyze the input received from the various pixels of sensor array 206 to determine locations of objects. According to some embodiments, determination of an object's existence is made via contrast determination with the raw, unfiltered EM radiation. That is, certain columns of pixels of sensor array 206 receive unfiltered light, and the output of these sensors can be used to determine contrast differences of the received light to make out whether an object is present. The size of the object corresponds to the number of pixels and the location of the pixels on sensor array 206 that correspond to EM radiation received from the object. For example, a first object identified in a 2×2 cluster of pixels at one end of sensor array 206 corresponds to the first object having a first size at a first distance away, while a second object identified in a 2×2 cluster of pixels at the opposite end of sensor array 206 corresponds to a second object that is smaller than the first object and is closer than the first object. For the sake of comparison, if the first object was closer (e.g., imaged using the pixels at the opposite end of sensor array 206, it would be identified in a greater number of pixels (e.g., 6×6 pixels).

According to some embodiments, processing device 208 is coupled to an object database 210. Object database 210 includes one or more memory devices such as volatile memory (e.g., dynamic random-access memory (DRAM)), nonvolatile memory (e.g., read-only memory (ROM)), flash memory, solid state memory, and/or a hard drive. According to some embodiments, object database 210 stores known sizes for a variety of possible objects in order to help eliminate identified objects from being the desired target. Object database 210 may store objects as having a certain known size which corresponds to a given number of pixels on sensor array 206 at a given distance away. For example, a tank may be stored in object database 210 as having a certain size that corresponds to a 2×2 cluster of pixels when the tank is 6 Km away, or a 4×4 cluster of pixels when the tank is 3 Km away. Any number of possible objects and their associated size can be stored in object database. In some embodiments, further distinguishing features or details are stored about a given objects, such as known multispectral or polarization signatures of a given object that can be used to positively identify the object based on the polarized and multispectral EM radiation received at sensor array 206.

According to some embodiments, processing device 208 uses known information about the desired target from object database 210 to eliminate identified objects that are not the desired target. For example, if a desired target is known to have a size corresponding to 2×2 pixels at a distance of 6 Km, then any objects identified from the sensors that correspond to EM radiation received from 6 Km away can be eliminated if they are found to be smaller than 2×2 pixels or larger than 2×2 pixels. In this example, further analysis is performed on all objects that are 2×2 pixels (or close enough) to determine if any of the objects is the desired target.

Once a first elimination of objects has been performed based on contrast data, further analysis is performed on the remaining objects based on the polarization and multispectral data, according to some embodiments. Recall that different columns of sensors on sensor array 206 can receive EM radiation that has been filtered or polarized. The EM radiation received from any given object passes through multiple different filter types across filter substrate 204 as areobody 102 flies towards it. Either or both polarization and multispectral signatures may be used to distinguish between a desired target (e.g., a tank) and an undesired target (e.g., a rock, vegetation, or structure having the same general size as the tank). Accordingly, further rounds of target elimination may be performed using polarization and/or multispectral signatures to weed out other objects as not being the desired target. By eliminating objects as being the desired target, only the desired target will remain (assuming it is present in FOV 106).

According to some embodiments, processing device 208 is coupled to a guidance system 212 that controls the flightpath of areobody 102. Once processing device 208 either positively identifies the target object or eliminates all possible objects except for the target object, processing device 208 sends the location of the desired object to guidance system 212. Guidance system 212 may control any flight aspects of areobody 102 (thrust, yaw, pitch, etc.) to change the flight trajectory. Once a location of the desired target is known, guidance system 212 may alter the flight path of areobody 102 to guide it to the desired target. In some embodiments, guidance system 212 also has access to object database 210 to further confirm any information regarding the desired target.

In some embodiments, guidance system 212 receives further input from an inertial navigation system (INS) located on areobody 102. In some embodiments, guidance system 212 obtains GPS data for some portion of the flight that can be used to identify position and tracking. According to some embodiments, guidance system 212 uses the input from the INS and the determined location of the desired target from processing device 208 to affect an azimuth angle and/or an elevation angle of areobody 102 to ensure that areobody 102 remains on course to intercept the intended target. As noted above, one or more of the operations of guidance system 212 may also be carried out by processing device 208.

It should be understood that ground imaging system 201 may include more components or fewer components than the illustrated components without deviating from its desired purpose of providing different forms of filtered EM radiation to sensor array 206. In some examples, guidance system 212 and processing device 208 are part of the same FPGA unit. In some examples object database 210 is included within ground imaging system 201. According to some embodiments, ground imaging system 201 is modular in design and can be installed or retrofitted to any areobody having guidance capabilities.

Figure 3:
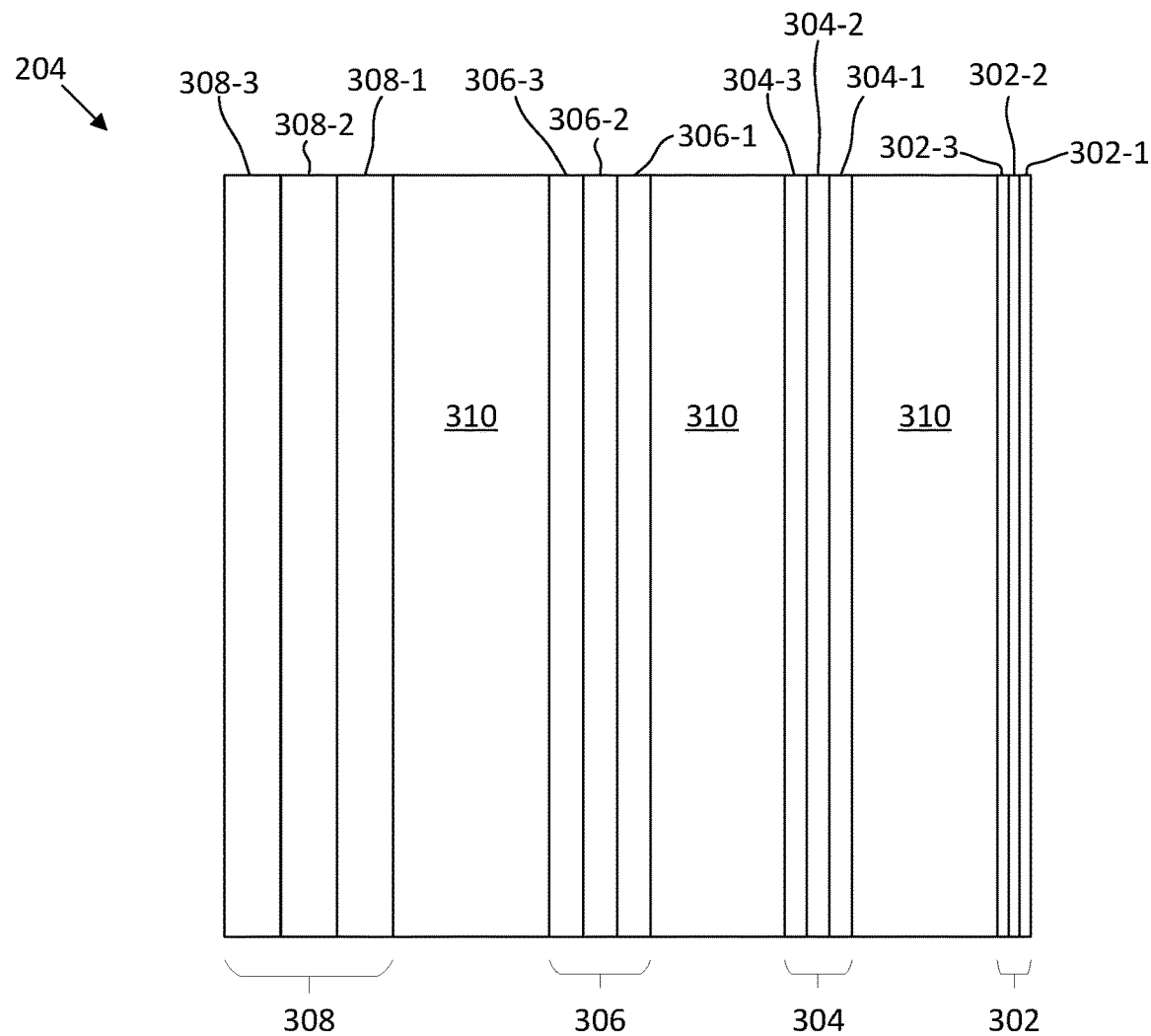
FIG. 3 illustrates a top-down view of an example filter substrate having columns of different filters, in accordance with some embodiments of the present disclosure.

FIG. 3 illustrates a top-down view of filter substrate 204, according to some embodiments. As discussed previously, filter substrate 204 includes a plurality of different filter types that may be arranged in columns across filter substrate 204, where each column is configured with one filter type. According to some embodiments, the columns of different filter types are grouped in different regions of filter substrate 204. For example, filter substrate 204 may include four different regions 302-308 that correspond to EM radiation received at different distances within the FOV of the areobody.

Each of regions 302-308 include columns of different types of filters. For example, a first region 302 includes column(s) of contrast filters 302-1, column(s) of polarization filters 302-2, and column(s) of multispectral filters 302-3. A second region 304 includes column(s) of contrast filters 304-1, column(s) of polarization filters 304-2, and column(s) of multispectral filters 304-3. A third region 306 includes column(s) of contrast filters 306-1, column(s) of polarization filters 306-2, and column(s) of multispectral filters 306-3. And a fourth region 308 includes column(s) of contrast filters 308-1, column(s) of polarization filters 308-2, and column(s) of multispectral filters 308-3. It should be noted that for the purpose of this discussion, the contrast filters represent regions of filter substrate 204 where no filtering is occurring to the received EM radiation (e.g., received radiation is merely passed through with little to no modulation). Rather, the light received from these contrast regions is used to perform contrast detection and spatial filtering in software (e.g., image processing software) to identify presence of objects.

For any given column(s) of filters, different filters may be present for different wavelengths or polarization angles. For example, column(s) of polarization filters 302-2 include a first column of polarization filters for light having a 30-degree rotation at a first IR wavelength band and a second adjacent column of polarization filters for light having a 60-degree rotation at the first IR wavelength band or at a different IR wavelength band. According to some embodiments, each filter region 302-308 includes columns of polarization filters across 6-10 different angle rotations and across 3-5 different IR bands. In another example, column(s) of multispectral filters 302-3 include a first column of multispectral filters for a first IR wavelength band and at least a second column of multispectral filters for a different IR wavelength band. Any number of columns of multispectral filters can be provided to yield different IR wavelengths bands. In some embodiments, each filter region 302-308 includes columns of multispectral filters across 4-10 different IR wavelength bands.

According to some embodiments, a different number of total columns of filters are present within each of regions 302-308. This corresponds to the expected size of imaged objects within the FOV (e.g., objects at the far end of the FOV, corresponding to first region 302, are smaller than objects at the near end of the FOV, corresponding to fourth region 308). Thus, and in accordance with some embodiments, first region 302 includes the fewest total number of columns of filters and fourth region 304 includes the highest total number of columns of filters. In one example, first region 302 includes around 50 columns of filters (e.g., corresponding to 50 columns of pixels on sensor array 206), second region 304 includes around 75 columns of filters (e.g., corresponding to 75 columns of pixels on sensor array 206), third region 306 includes around 100 columns of filters (e.g., corresponding to 100 columns of pixels on sensor array 206), and fourth region 308 includes around 150 columns of filters (e.g., corresponding to 150 columns of pixels on sensor array 206). In one particular example, first region 302 includes 10 columns of contrast filters 302-1, 20 columns of polarization filters 302-2, and 20 columns of multispectral filters 302-3.

According to some embodiments, filter substrate 204 includes unused regions 310 between each of regions 302-308. Unused regions 310 correspond to columns of sensors of sensor array 206 that are unprocessed to reduce the burden on processing device 208. Fewer or narrower unused regions 310 will yield more imaging data to be analyzed, which may be possible if provided the requisite processing power.

Figure 4:
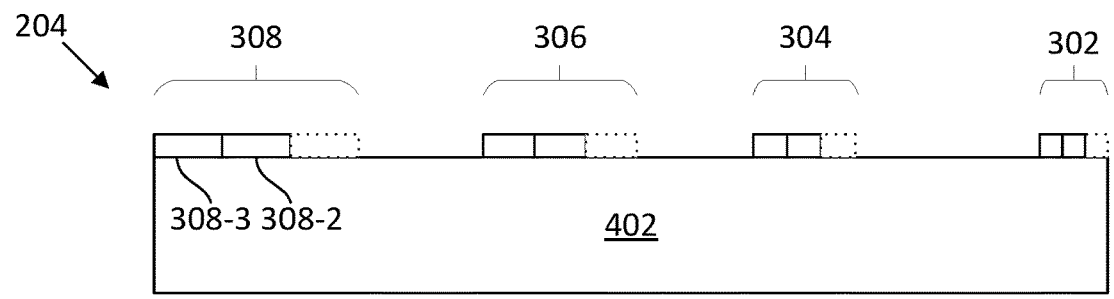
FIG. 4 illustrates a side view of an example filter substrate, in accordance with some embodiments of the present disclosure.

FIG. 4 illustrates a side view of filter substrate 204, according to some embodiments. The side-view shows each filter region 302-308 having column(s) of different filter types as well as contrast filters (shown outlined with a dotted line). Filter substrate 204 includes a substrate 402 that comprises a material providing little to no absorption of the received EM radiation of interest (e.g., generally radiation in the short-wave IR range). In some examples, substrate 402 is borosilicate glass.

According to some embodiments, each of the columns of polarization filters, such as column(s) of polarization filters 308-3, are formed using micro-sized grating structures that are lithographically patterned onto a surface of substrate 402. The spacing between the grating patterns and relative size of the grating lines dictates the polarization angle of light that is allowed through. In some embodiments, the gratings are formed from metal or dielectric materials. The patterned grating structures are one example of thin film linear polarizers.

According to some embodiments, each of the columns of multispectral filters, such as column(s) of multi spectral filters 308-2, are formed from multiple layers of dielectric materials stacked on top of one another. The stacked dielectric layers can be very thin (on the order of nanometers thick) and absorb or reflect specific wavelengths of light to create a notch filter. An arrangement of these notch filters is used to filter the incoming EM radiation and create specific multispectral signatures to be analyzed.

Figure 5:
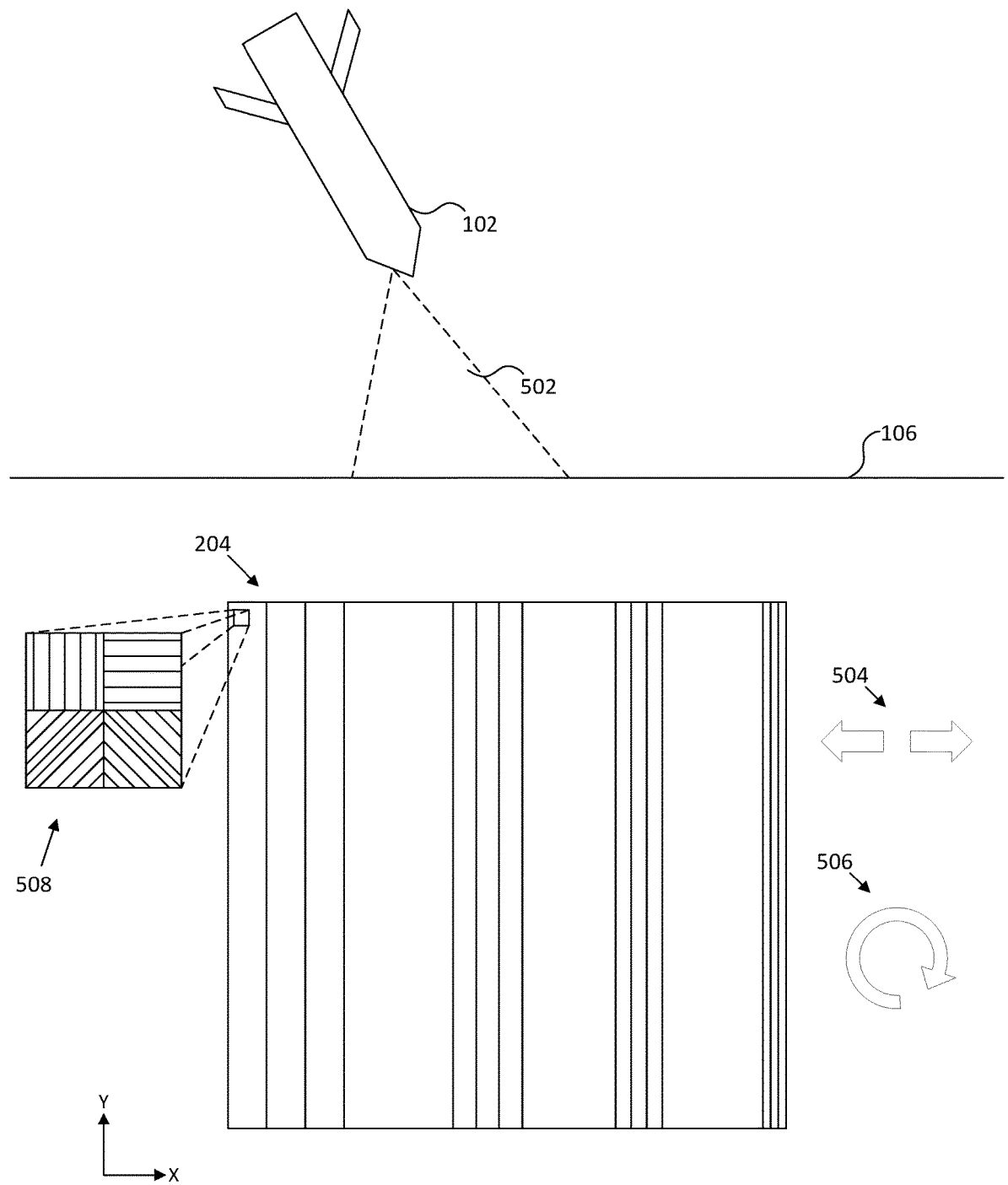
FIG. 5 illustrates a guided projectile angled further towards the ground and a filter substrate designed to be moved to use different filters on portions of the received electromagnetic radiation, in accordance with an embodiment of the present disclosure.

FIG. 5 illustrates a situation where areobody 102 has pitched itself forward towards ground 104 such that it has a narrower FOV 502 of ground 104. This situation may arise when a desired target has been identified and areobody 102 is angling downward to intercept the target. However, with FOV 502, the push-broom effect no longer occurs as the forward motion vector of areobody 102 along ground 104 is too small for objects to be scanned across the various filter columns of filter substrate 204. Thus, as the guided projectile angles further towards the ground, the filter substrate 204 can be moved to use different filters on portions of the received electromagnetic radiation, in accordance with an embodiment of the present disclosure In more detail, and according to some such embodiments, filter substrate 204 is moved in order to pass the various filters across different portions of EM radiation received across FOV 502. As can be seen, the movement may be a linear translation 504 or a circular motion 506. Note that the circular motion 506 does not require any rotation of filter substrate 204 but rather circular movement within the XY plane. The linear translation 504 is in the X-direction to ensure that the EM radiation from across FOV 502 crosses over the different columns of filters on filter substrate 204. Any type of linear actuator may be used to cause movement of filter substrate 204. In some embodiments, the motion of filter substrate 204 is timed with a frame rate of the camera that includes sensor array 206. In one example, circular motion 506 is performed to provide 0.001 inch by 0.001 inch motion for a desired target having a pixel size of 2×2. In another example, linear translation 504 translates filter substrate 204 back and forth by 0.002 inches each direction.

Different filters may be clustered together to ensure that multiple filters interact with EM radiation received from a given object. For example, filter set 508 illustrates a mosaic of filters from columns of polarization filters on filter substrate 204. The 2×2 filter set 508 includes four filters that correspond with 4 pixels (2×2 pixels) of sensor array 206. Each of the polarization filters is designed to pass through a different polarization angle of the light. According to some embodiments, circular motion 506 is applied to filter substrate 204 to move each of the various filters in filter set 508 in the same circular motion and ensure that the received EM radiation from a given object is passed through each of the filters of filter set 508. This same concept may be applied to any sized filter set and across other types of filter as well, such as any of the multispectral filters.

Figure 6:
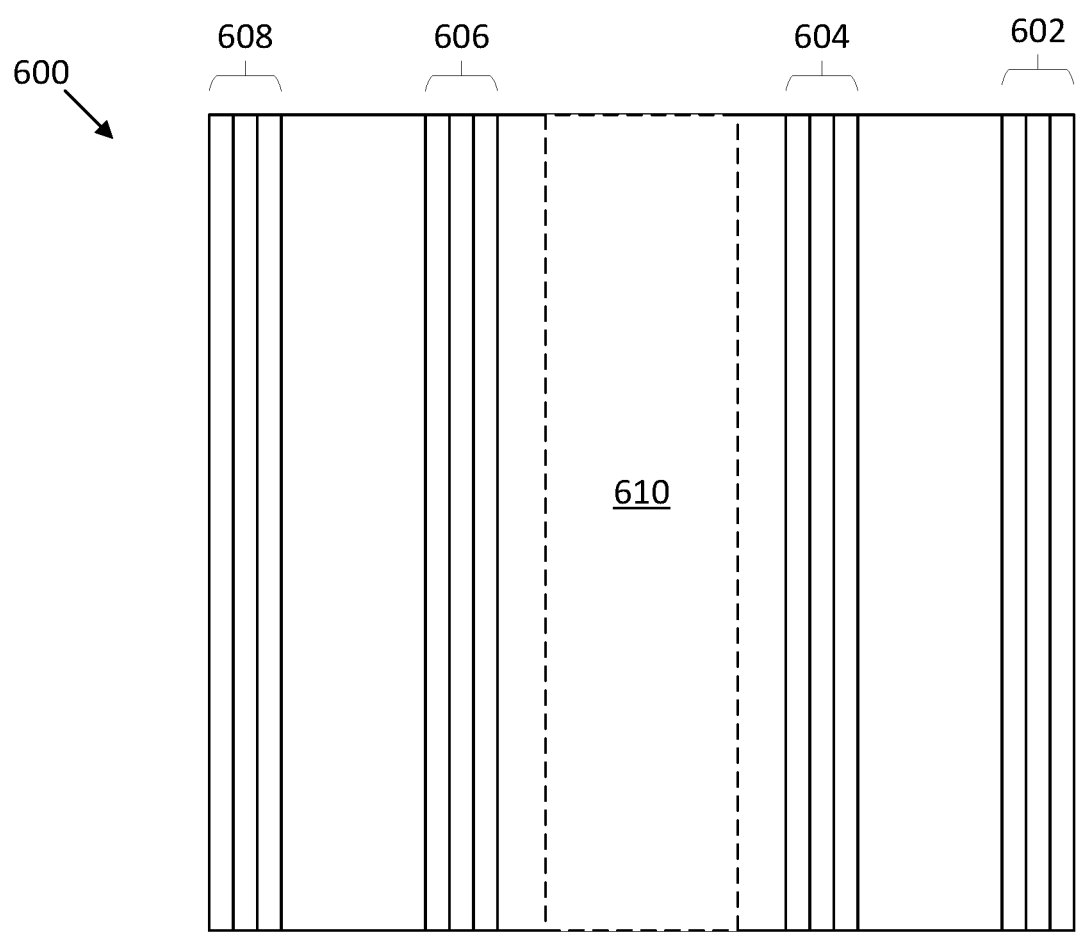
FIG. 6 illustrates another example of a filter substrate, in accordance with some embodiments of the present disclosure.

FIG. 6 illustrates another example of a filter substrate 600, according to some embodiments of the disclosure. As can be seen, filter substrate 600 is configured with a different design than filter substrate 204. Note, however, that filter substrate 600 can be used within ground imaging system 201 in the same way as filter substrate 204. According to some embodiments, filter substrate 600 includes filter regions 602-608 that each include roughly the same number of columns of filters. For example, each of filter regions 602-608 includes columns of polarization filters, multispectral filters and contrast filters that total around 50 columns. According to some embodiments, a large central portion of filter substrate 600 includes a contrast region 610 that is used for contrast determination of objects directly in front of the areobody, such as the situation illustrated in FIG. 5 where the areobody is focusing in on its desired target and pitching downwards towards the ground. Corresponding columns of sensors within the central portion of sensor array 206 receive the light passing through contrast region 610. This received light may be used for final contrast determination of the objects around the desired target to make any last second adjustments to the flightpath of the areobody.

Methodology

Figure 7:
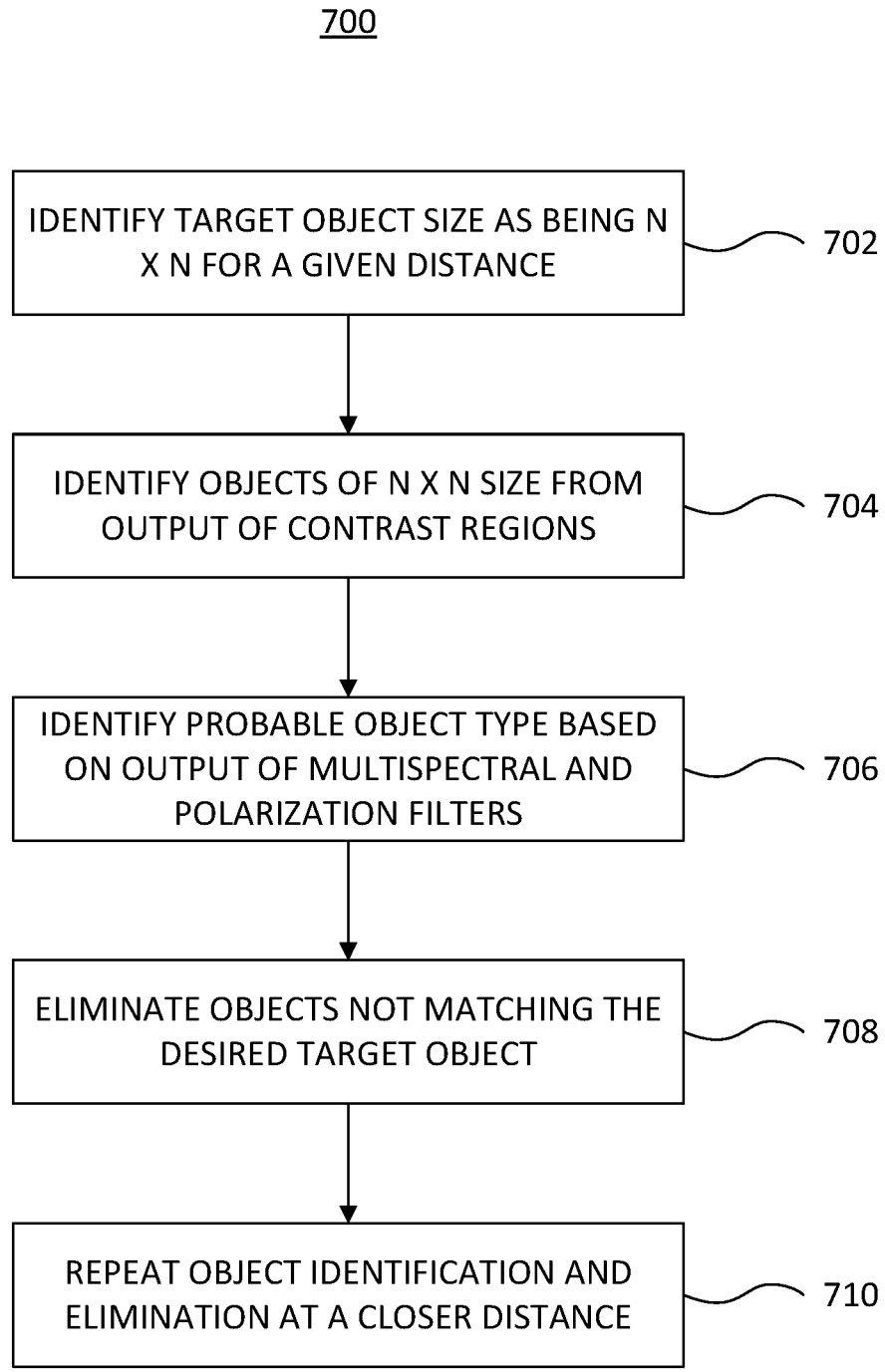
FIG. 7 illustrates a flowchart of a method of verifying target objects using output from filters of a filter substrate, in accordance with an embodiment of the present disclosure.

FIG. 7 is a flowchart illustrating an example method 700 for identifying a target object based on contrast, polarization, and multispectral signatures of received EM radiation, in accordance with certain embodiments of the present disclosure. As can be seen, the example method includes a number of phases and sub-processes, the sequence of which may vary from one embodiment to another. However, when considered in the aggregate, these phases and sub-processes form a process for target object identification and/or elimination of other objects from being the target object in accordance with certain of the embodiments disclosed herein. These embodiments can be implemented, for example using the ground imaging system 201 in FIG. 2 as described above. More specifically, these embodiments can be implanted using processing device 208. However other system architectures can be used in other embodiments, as will be apparent in light of this disclosure. To this end, the correlation of the various functions shown in FIG. 7 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module having decoupled sub-modules can be used to perform all of the functions of method 700. Thus, other embodiments may have fewer or more modules and/or sub-modules depending on the granularity of implementation. In still other embodiments, the methodology depicted can be implemented as a computer program product including one or more non-transitory machine-readable mediums that when executed by one or more processors cause the methodology to be carried out. Numerous variations and alternative configurations will be apparent in light of this disclosure.

Method 700 begins at block 702 where the expected size of a desired target is identified. Target size information may be stored in a database for a variety of different objects. The database can be updated with new objects or edited to change expected size parameters for any of the stored objects. The size information may be stored in association with a distance away from the areobody. For example, the size of tank may be stored in the database as encompassing 2×2 pixels (e.g., of a sensor array) at a distance of 6 Km, and 4×4 pixels at a distance of 3 Km. The relative size of an object based on number of pixels on the sensor array is also dependent on the optics of the ground imaging system that receives the EM radiation. In some embodiments, other distinguishing features of the target object are provided in the database, such as a shape of the target object or certain expected multispectral or polarization signatures of the target object.

Method 700 continues with block 704 where objects are identified using contrast determination from EM radiation received through contrast filters (e.g., regions). According to some embodiments, certain columnar regions of a filter substrate allow light to pass through unfiltered so that the raw EM radiation can be received and analyzed using image processing techniques to identify contrast differences corresponding to light reflecting off of different objects. Different sized objects may be identified at a given distance away. The object distance corresponds to which pixels of the sensor array are being used to identify the presence of the object, as discussed above. Since the target object size for the given distance is known, any other identified objects at the given distance that are either smaller or larger than the expected size of the target object can be eliminated as being the target object. Accordingly, only objects that are the same relative size as the target object are left for further analysis. According to some embodiments, the processing device may utilize a boost filter or other similar boost techniques to sharpen edges of the contrast from the received EM radiation.

According to one example, the first 10 columns of sensors of a sensor array are designated for contrast filtering and receive light from a given distance away. The size of a desired target object is known to be 2×2 pixels at the given distance away. Thus, using contrast filtering on the received EM radiation across the first 10 or fewer columns of sensors, any objects having a size of about 2×2 pixels are flagged as possibly being the desired target object, any objects that are close in size (e.g., 1×1 or 3×3) are flagged as being less likely to be the desired object, and any objects over a threshold size (e.g., 4×4 or greater) are tossed out as not being the desired target object. According to some embodiments, objects flagged as being "less likely" may still be analyzed in future operations that involve multispectral or polarization signatures. In some embodiments, objects flagged as being "less likely" undergo further contrast analysis either using input from more sensors corresponding to the object's given distance away or from sensors that correspond to the object being at a closer distance away at a later moment in time.

Method 700 continues with block 706 where the probable objects based on similar size to the desired target object are further analyzed to determine what the objects are (e.g., rocks, vegetation, vehicular, building, etc.) According to some embodiments, this determination is performed based on multispectral and/or polarization signatures from EM radiation received from the objects. As discussed above, the EM radiation received from the objects passes through columns of polarization and multispectral filters (as the areobody flies forward) to be received by corresponding columns of sensors in the sensor array.

With regards to the multispectral filters, they may be arranged in columns of similar notch filters, or in a mosaic pattern (e.g., 2×2 pixel cluster of four different notch filters for different stop bands). For a desired target object having a known size of N×N, certain ratios of the received EM radiation from each of the N×N sensor pixels are analyzed and compared to generate flags for the object as either being likely, less likely, or naturally occurring (e.g., a rock or vegetation).

With regards to the polarization filters, they may be similarly arranged in columns of similar angle polarizations, or in a mosaic pattern (e.g., 2×2 pixel cluster of 4 different polarization angle filters). According to some embodiments, polarized light is received having a different polarization angle from each column of polarization filters. The columns of filters may be organized in pairs of opposing angles such that adjacent polarization filter columns provide horizontal and vertical polarization, or 30-degree rotation and 60-degree rotation to name a few examples. Certain ratios of the output from the pairs of polarization filter columns are analyzed to determine one or more polarization signatures of the object and can be used to determine if the object is either likely, less likely, or naturally occurring (e.g., a rock or vegetation).

Following either or both the multispectral and polarization analysis, any objects determined to be naturally occurring can be eliminated as being the target object, according to some embodiments. In some cases, objects that are flagged as less likely following either or both the multispectral and polarization analysis are also eliminated, or the objects undergo further multispectral and/or polarization analysis either using input from more sensors corresponding to the object's given distance away or from sensors that correspond to the object being at a closer distance away at a later moment in time.

Method 700 continues with block 708 where any objects not matching expected size or signature parameters of the target object are eliminated from being the desired target object. As noted above, this block may be performed as a part of block 704 and/or block 706. According to some embodiments, the goal of block 708 is to continually remove identified objects as being the desired target object as more information is received from each of the different types of sensors (e.g., contrast, multispectral, and polarization) and from sensors corresponding to different distances away (e.g., the object gets larger as it gets closer and more sensors receive more EM radiation from the object as it gets larger). The elimination of objects allows the guidance system to zero in on the target object via the process of elimination and also reduces computational burden by only analyzing received EM radiation from the remaining objects that are flagged as likely being the target object.

Figure 1B:
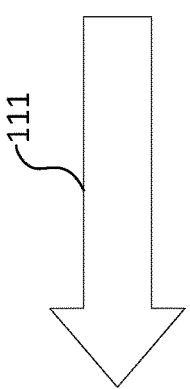

Method 700 continues with block 710 where at least the object identification operation of block 706 and object elimination operation of block 708 are repeated using different columns of sensors associated with a closer distance to the areobody. The various columns of sensors receive light from different distances along the FOV of the areobody and a given object will be imaged across the columns of sensors of the sensor array as the areobody flies closer to it due to the push broom effect (as discussed in more detail with reference to FIG. 1.) According to some embodiments, block 704 is also repeated across sensors associated with different distances to perform contrast analysis and eliminate objects that are of a different size (or shape) compared to the target object. Once all identified objects (or at least a threshold percentage of objects) other than the target object have been eliminated, the guidance system on board the areobody can guide the areobody towards the target object using only contrast analysis, for example, for the final portion of the flight to hone in on the target object.

Some of the embodiments discussed herein may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like.

The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

Further Example Embodiments

The following examples pertain to further embodiments, from which numerous permutations and configurations will be apparent.

Example 1 is a ground imaging system that is designed for use on a guided areobody. The ground imaging system includes one or more lenses configured to receive electromagnetic radiation from objects and terrain at a ground level, a filter substrate comprising a plurality of filters, a sensor array configured to receive the electromagnetic radiation from the filter substrate, and a processing device coupled to the sensor array. The filter substrate is located at a focal plane of the one or more lenses such that the filter substrate receives the electromagnetic radiation from the one or more lenses. The plurality of filters includes polarization filters and multispectral filters. The processing device is configured to analyze multispectral and polarization signatures of the electromagnetic radiation from the objects and terrain at the ground level, and determine that one or more objects is not a desired target based at least on the multispectral and polarization signatures of the one or more objects.

Example 2 includes the subject matter of Example 1, wherein the processing device comprises a field programmable gate array (FPGA).

Example 3 includes the subject matter of Example 1 or 2, wherein the polarization filters and the multispectral filters are arranged in columns.

Example 4 includes the subject matter of Example 3, wherein the filter substrate includes a first region having a first column of polarization filters and a first column of multispectral filters, the first column of polarization filters and the first column of multispectral filters corresponding to a first column of sensors and a second column of sensors, respectively, of the sensor array, and the filter substrate includes a second region having a second column of polarization filters and a second column of multispectral filters, the second column of polarization filters and the second column of multispectral filters corresponding to a third column of sensors and a fourth column of sensors, respectively, of the sensor array.

Example 5 includes the subject matter of Example 4, wherein the first column of sensors and the second column of sensors are included in a first sensor column group, the third column of sensors and the fourth column of sensors are included in a second sensor column group, the first sensor column group being larger than the second sensor column group.

Example 6 includes the subject matter of Example 4 or 5, wherein the first region of the filter substrate corresponds to electromagnetic radiation received from objects and terrain at a first distance from the aerobody and the second region of the filter substrate corresponds to electromagnetic radiation received from objects and terrain at a second distance from the aerobody, the second distance being larger than the first distance.

Example 7 includes the subject mater of Example 6, wherein electromagnetic radiation received from a given object through the first region corresponds to first expected pixel size for the given object, and wherein electromagnetic radiation received from the given object through the second region corresponds to second expected pixel size for the given object, the first expected pixel size being larger than the second expected pixel size.

Example 8 includes the subject matter of Example 3, wherein each column of the polarization filters is mapped to corresponding first columns of sensors of the sensor array and each column of multispectral filters is mapped to corresponding second columns of sensors of the sensor array.

Example 9 includes the subject matter of Example 8, wherein third columns of sensors of the sensor array receive unfiltered electromagnetic radiation from the filter substrate.

Example 10 includes the subject matter of Example 9, wherein the processing device is further configured to analyze contrast signatures of the unfiltered electromagnetic radiation.

Example 11 includes the subject matter of Example 9 or 10, wherein the first columns of sensors, the second columns of sensors, and the third columns of sensors are adjacently arranged one after the other.

Example 12 includes the subject matter of any one of Examples 1-11, wherein the multispectral filters comprise a plurality of notch filters.

Example 13 includes the subject matter of any one of Examples 1-12, wherein the polarization filters comprise thin film linear polarizers.

Example 14 includes the subject matter of any one of Examples 1-13, further comprising an actuator coupled to the filter substrate and configured to move the filter substrate with respect to the sensor array.

Example 15 includes the subject matter of any one of Examples 1-14, wherein the sensor array comprises a microbolometer or a focal plane array.

Example 16 is a filter substrate for use in an imaging system. The filter substrate is designed to receive electromagnetic radiation and map the electromagnetic radiation onto a sensor array. The filter substrate includes a substrate, a plurality of polarization filters arranged in first columns on the substrate, a plurality of multispectral filters arranged in second columns on the substrate, and a plurality of unfiltered regions arranged in third columns on the substrate. The first columns, second columns, and third columns are adjacently arranged one after the other on the substrate.

Example 17 includes the subject matter of Example 16, wherein the filter substrate includes a first region having first, second, and third columns of a first width and a second region having first, second, and third columns of a second width greater than the first width.

Example 18 includes the subject matter of Example 17, wherein the first region of the filter substrate corresponds to electromagnetic radiation received from a first distance from the filter substrate and the second region of the filter substrate corresponds to electromagnetic radiation received from a second distance from the filter substrate, the first distance being larger than the second distance.

Example 19 includes the subject matter of Example 17 or 18, wherein the first region of the filter substrate corresponds to imaged objects having a first pixel size and the second region of the filter substrate corresponds to imaged objects having a second pixel size larger than the first pixel size.

Example 20 includes the subject matter of any one of Examples 17-19, further comprising an unfiltered region between the first region and the second region having a width that spans a distance between the first region and the second region.

Example 21 includes the subject matter of any one of Examples 16-20, wherein the substrate comprises borosilicate glass.

Example 22 includes the subject matter of any one of Examples 16-21, wherein the plurality of multispectral filters comprise a plurality of notch filters.

Example 23 includes the subject matter of any one of Examples 16-22, wherein the plurality of polarization filters comprise thin film linear polarizers.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

What is claimed is:

1. A ground imaging system configured for use on a guided aerobody, the ground imaging system comprising:
   one or more lenses configured to receive electromagnetic radiation from objects and terrain at a ground level;
   a filter substrate comprising a plurality of filters, the filter substrate located at a focal plane of the one or more lenses such that the filter substrate receives the electromagnetic radiation from the one or more lenses, wherein the plurality of filters includes polarization filters and multispectral filters, wherein the polarization filters and the multispectral filters are arranged in columns;
   a sensor array configured to receive the electromagnetic radiation from the filter substrate;
   a processing device coupled to the sensor array and configured to
      analyze multispectral and polarization signatures of the electromagnetic radiation from the objects and terrain at the ground level, and
      determine that one or more objects is not a desired target based at least on the multispectral and polarization signatures of the one or more objects;
   wherein the filter substrate includes a first region having a first column of polarization filters and a first column of multispectral filters, the first column of polarization filters and the first column of multispectral filters corresponding to a first column of sensors and a second column of sensors, respectively, of the sensor array, and the filter substrate includes a second region having a second column of polarization filters and a second column of multispectral filters, the second column of polarization filters and the second column of multispectral filters corresponding to a third column of sensors and a fourth column of sensors, respectively, of the sensor array; and
   wherein the first region of the filter substrate corresponds to electromagnetic radiation received from objects and terrain at a first distance from the aerobody and the second region of the filter substrate corresponds to electromagnetic radiation received from objects and terrain at a second distance from the aerobody, the second distance being larger than the first distance.

2. The ground imaging system of claim 1, wherein the processing device comprises a field programmable gate array (FPGA).

3. The ground imaging system of claim 1, wherein the first column of sensors and the second column of sensors are included in a first sensor column group, the third column of sensors and the fourth column of sensors are included in a second sensor column group, the first sensor column group being larger than the second sensor column group.

4. The ground imaging system of claim 1, wherein electromagnetic radiation received from a given object through the first region corresponds to first expected pixel size for the given object, and wherein electromagnetic radiation received from the given object through the second region corresponds to second expected pixel size for the given object, the first expected pixel size being larger than the second expected pixel size.

5. The ground imaging system of claim 1, wherein each column of the polarization filters is mapped to corresponding first columns of sensors of the sensor array and each column of multispectral filters is mapped to corresponding second columns of sensors of the sensor array.

6. The ground imaging system of claim 5, wherein third columns of sensors of the sensor array receive unfiltered electromagnetic radiation from the filter substrate.

7. The ground imaging system of claim 6, wherein the processing device is further configured to analyze contrast signatures of the unfiltered electromagnetic radiation.

8. The ground imaging system of claim 6, wherein the first columns of sensors, the second columns of sensors, and the third columns of sensors are adjacently arranged one after the other.

9. The ground imaging system of claim 1, wherein the multispectral filters comprise a plurality of notch filters and the polarization filters comprise thin film linear polarizers.

10. The ground imaging system of claim 1, further comprising an actuator coupled to the filter substrate and configured to move the filter substrate with respect to the sensor array.

11. The ground imaging system of claim 1, wherein the sensor array comprises a microbolometer or a focal plane array.

* * * * *